Aug. 1, 1933.                D. R. SHOULTS                1,920,897
                              CONTROL SYSTEM
                            Filed March 5, 1932

Inventor:
David R. Shoults,
by Charles E. Tullar
His Attorney.

Patented Aug. 1, 1933

1,920,897

UNITED STATES PATENT OFFICE 1,920,897

CONTROL SYSTEM

David R. Shoults, Scotia, N. Y., assignor to General Electric Company, a Corporation of New York Application March 5, 1932. Serial No. 597,034

9 Claims. (Cl. 242—75)

My invention relates to motor control systems, more particularly to systems wherein a driven element is caused to exert a constant resistance to movement by a driving element and has for an object the provision of a simple and efficient system of this character.

One application, where my invention may be used advantageously is in the rewinding of paper. Heretofore, a small generator has been attached to the reel of paper so that after the reel began rotating the generator acted as a brake to maintain tension on the strip of paper. In these systems, however, no braking effort was exerted by the generator until after the roll of paper had been set in motion.

While particularly applicable to control systems for sheet material, it is to be understood that my invention may be applied whenever it is desirable to maintain tension on a driven element while at standstill or while in motion.

In accordance with my invention in one form thereof, I provide a drag generator arranged to produce a voltage equal and in opposition to the counter-electromotive force of the driving motor, together with an auxiliary generator excited from a constant source of supply and in response to the driving motor current so that the auxiliary generator causes the drag generator to oppose with constant effort the driving motor whether the motor is rotating or is at a standstill.

Figure 1:
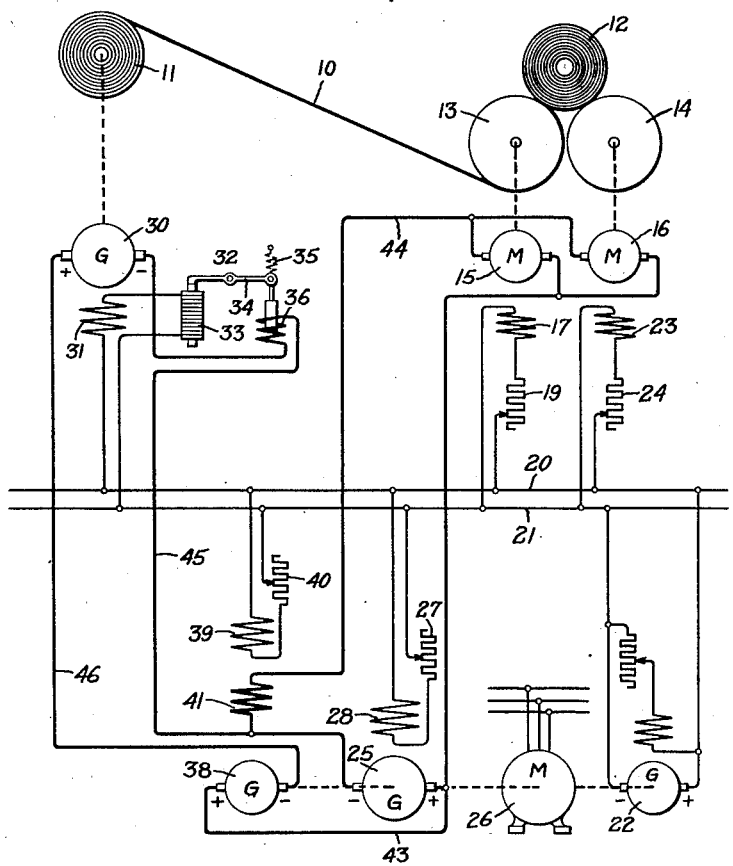
Figure 2:
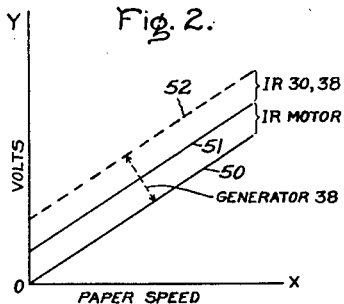

For a more complete understanding of my invention, reference should now be had to the drawing in which Fig. 1 diagrammatically illustrates my invention as applied to a control system for maintaining constant tension on a strip of paper, while in Fig. 2 I have shown curves explanatory of the operation of the system shown in Fig. 1.

Referring to the drawing, I have shown my invention in one form as applied to the control of the tension of a strip of paper 10 arranged to be wound from a reel 11 to a reel 12. The reel 12 is supported by the rolls 13 and 14 which rolls are respectively driven by the direct current motors 15 and 16. A separately excited field winding 17 provides excitation for the motor 15. This field winding is connected through a field rheostat 19 across a constant voltage source of direct current supply as indicated by the supply lines 20 and 21 connected to a self-excited generator 22. Similarly a separately excited field winding 23 connected in series with a field rheostat 24 supplies excitation for the motor 16. A variable voltage direct current generator 25 driven by an alternating current motor 26 is connected in a local circuit with the motors 15 and 16. The excitation and voltage of the generator 25 is controlled by means of a field rheostat 27 connected in series with a separately excited field winding 28. It will be understood that the rheostat 27 controls the voltage of the generator 25 and consequently the speed of the motors 15 and 16 may be varied to correspond with the change in diameter of the reel 12, or as desired.

A substantially constant braking effort is applied to the reel 11 by means of a generator 30 mechanically conected to the reel 11. A separately excited field winding 31 is provided for the braking generator 30 with a regulator 32 arranged to control the excitation of this field winding so that the voltage generated is equal at all times to the counter-electromotive force of the motors 15 and 16. The regulator 32 consists of a carbon pile resistance 33 connected in series with the field winding 31. A lever 34 is normally biased against the carbon pile resistance 33 by a spring 35. A coil 36 connected in series with the armature of the generator 30 is arranged to oppose the bias of the spring 35 so that if the current increases in the coil 36 the resistance of the carbon pile 33 increases thereby diminishing the excitation of the field winding 31.

An auxiliary generator 38 preferably driven from the same driving shaft as the generator 25 has its armature connected in series with the armature of the generator 30. Excitation for the auxiliary generator 38 is provided by a separately excited field winding 39, the excitation of which is controlled by a field rheostat 40. A series field winding 41 is connected in series with the variable voltage generator 25 and the motors 15 and 16. The field windings 39 and 41 under normal conditions of operation jointly function to increase the excitation of the auxiliary generator 38.

With the above understanding of the elements and their organization with respect to each other in the system, the operation of the system itself and the manner in which the generator 30 is controlled to maintain constant tension on the strip of paper 10 irrespective of whether the paper is in motion or at a standstill, will be readily understood from the description which follows:

It will be assumed that the alternating current motor 26 is rotating at substantially constant speed so that the exciter 22 is producing a substantially constant voltage on the excitation busses 20 and 21. It will further be assumed that the rheostat 27 has its maximum amount of resistance connected in the field winding 28 so that there is relatively no excitation on the generator 25 and consequently a minimum amount of voltage produced thereby. It will then be obvious that the generator 25 supplies practically no current to the armatures of the motors 15 and 16. However, the separately excited field winding 39 of the auxiliary generator 38 provides sufficient excitation to cause current to flow through the armature of the braking generator 30. The flow of current will be from the positive brush of the generator 38 by conductor 43, armatures of motors 15 and 16, conductor 44, series field winding 41, conductor 45, regulator coil 36, armature of the braking or drag generator 30, and by conductor 46 to the negative brush of the generator 38. A part of the current might flow through the armature of the generator 25 and thence to the braking generator 30 depending upon the resistance of these parallel paths. Inasmuch as the separately excited field winding 31 of the braking generator is energized, it will be seen that this generator or dynamo electric machine acting as a motor will tend to rotate in a direction to wind the paper upon the reel 11. Should there be slack in the paper between the reel 11 and the reel 12 the generator 30 operating as a motor will function to rotate the reel 11 until the slack is taken up. While the apparatus is at standstill, the field rheostat 40 may be adjusted until sufficient current is supplied to the braking generator 30 to maintain a desired amount of tension on the strip of paper 10.

It will now be assumed that the field rheostat 27 is adjusted so that the generator 25 produces sufficient voltage to cause the motors 15 and 16 to begin rotation in a direction to wind the paper 10 upon the reel 12. As soon as the reel 12 begins rotating the paper 10 rotates the reel 11 against the braking effort of the generator 30.

When the motors 15 and 16 reach their full speed, the braking generator 30 generates a voltage which is exactly equal to the counter-electromotive force generated by the motors 15 and 16. This will obviously be true as long as the speed of the generator 30 is equal to the speed of the motors 15 and 16 and if the generator 30 has the same characteristics as the motors 15 and 16.

In the event that the load on the motors 15 and 16 increases, for example due to increased bearing friction, their speed decreases while the IR drop of these motors becomes greater. The consequent reduction in counter-electromotive force is corrected for, however, by the series field winding 41 provided on the auxiliary generator 38.

It will be observed that as the paper is wound from the reel 11 the diameter of the reel diminishes and consequently the speed of the braking generator 30 is increased. This increased speed causes a larger current to flow in the series circuit including the regulator coil 36. The resistance of the carbon pile 33 is thereby increased to diminish the field excitation on the braking generator 30 as the current increases. The regulator thus functions to compensate for the increased speed of the braking generator in such a manner that the voltage of this generator is always maintained substantially equal to the counter-electromotive force of the motors 15 and 16.

The result of maintaining the generated voltage of the drag generator 30 equal to the counter-electromotive force of the motors irrespective of speed and correcting for the IR drop of the motors for all loads, is the exertion of a constant braking effort on the reel 11.

Referring now to the curves of Fig. 2 plotted with volts as ordinates and paper speed as abscissae the components of voltage supplied will be shown. The curve 50 represents motor counter-electromotive force. The ordinates between the curves 50 and 51 represent the IR drop of the motors while the ordinates between the curves 51 and 52 represent the IR drop in the drag and auxiliary generator armature circuits. Therefore the terminal voltage of the load generator 25 is represented by the ordinates from the X axis to the curve 51. The voltage required of the auxiliary generator 38 will then be represented by the ordinates between the curves 50 and 52.

If a power absorbing resistor were employed to consume the power developed by the generators 30 and 38 this power would be wasted. However, by connecting the series connected generators 30 and 38 in parallel with the motors 15 and 16 and the generator 25, the only losses due to the maintenance of tension in the strip 10 arise from the $I^2R$ losses in the circuit including the generators 30 and 38. The remainder of the power produced by these generators is returned to the system in the form of increased driving effort on the motors 15 and 16.

While I have described what I at present consider the preferred embodiment of my invention, it will be obvious to those skilled in the art that various changes and modifications may be made without departing from my invention and I therefore aim in the appended claims to cover all such changes and modifications as fall within the true spirit and scope of my invention.

What I claim as new and desire to secure by Letters Patent of the United States, is:

1. A motor control system including a driving motor arranged to continuously drive a load, a dynamo electric machine mechanically connected to said load so as to oppose the driving effort of said motor, an auxiliary generator, field windings therefor, connections for connecting said auxiliary generator in local circuit with said dynamo electric machine, and means for separately exciting at least one of said field windings so that said dynamo electric machine exerts a torque on said load while at standstill.

2. A motor control system including a driving motor arranged to drive a load, means for producing a substantially constant torque opposing said motor comprising a dynamo electric machine mechanically connected to said load, an auxiliary generator, connections for connecting said generator in circuit with said machine, a separately excited field winding for said generator, and means responsive to the load on said driving motor for producing additional excitation on said generator.

3. The combination with a material modifying apparatus provided with two operating elements, of a generator arranged to be driven by one of said elements, a driving motor for the other of said elements, means for supplying current to said motor, an auxiliary generator, connections for connecting said auxiliary generator in series with said braking generator and for connecting said series connected generators in parallel with said motor, and means for exciting said auxiliary generator so that current is supplied thereby to said braking generator at standstill and during rotation.

4. In a motor control system the combination of a driving motor and a material modifying apparatus, a braking generator connected to said apparatus so as to oppose the driving effort of said motor, means for progressively varying the voltage applied to said motor, and means for supplying substantially constant voltage to said braking generator at standstill so that said braking generator exerts said opposing torque on said motors when said motors are at standstill, and means for maintaining said torque substantially constant as said motor speed is increased from standstill to full speed.

5. In a motor control system the combination with a material modifying apparatus and a variable voltage drive therefor, of a drag generator mechanically connected to a driven element of said apparatus, an auxiliary generator arranged to be driven at substantially constant speed, connections for connecting said auxiliary generator in series with said drag generator and for connecting said series connected generators in parallel with said variable voltage drive, a separately excited field winding for said auxiliary generator, means for varying the excitation of said field winding so as to control the braking effort of said drag generator, and means responsive to the load current of said drive for varying the excitation of said auxiliary generator whereby the braking effort of said auxiliary generator is maintained constant for varying loads on said variable voltage drive.

6. In a motor control system the combination with a material modifying apparatus and a variable voltage drive therefor, of a drag generator mechanically connected to a driven element of said apparatus, an auxiliary generator arranged to be driven at substantially constant speed, connections for connecting said auxiliary generator in series with said drag generator and for connecting said series connected generators in parallel with said variable voltage drive, separately excited field winding for said auxiliary generator, means for varying the excitation of said field winding so as to control the braking effort of said drag generator, means responsive to the load current of said drive for varying the excitation of said auxiliary generator, and means responsive to the current of said drag generator for varying the excitation of said drag generator whereby the braking effort of said drag generator is maintained constant irrespective of its speed or of the load on said variable voltage drive.

7. Means for maintaining a constant differential of torque between two operating elements of a material modifying apparatus mechanically tied together by said material and provided with a braking generator for one of said elements and motor driving means for the other of said elements, comprising means for applying a voltage to said braking generator when at standstill to produce said differential of torque, and connections for applying the counter-electromotive force of said motor means to said generator during rotation whereby said torque difference is maintained between said two operating elements.

8. Means for maintaining a constant tension on material connecting two elements of a machine comprising a braking generator for one of said elements, a motor driving means for the other of said elements, means for applying a voltage to said braking generator, connections for applying the counter-electromotive force of said motor means to said generator, and means responsive to the motor load for increasing said voltage applied to said generator.

9. In combination, a plurality of rollers arranged to wind material from a supply reel, a direct current driving motor for each of said rollers, a direct current load generator, connections for connecting said load generator in local circuit with said motors, a drag generator mechanically connected to said supply reel, an auxiliary generator arranged to be rotated with said load generator, connections for connecting said drag generator and said auxiliary generator in series with each other and in parallel with said motors, a separately-excited field winding for said drag generator, means responsive to the current flowing through said drag generator for controlling its excitation, a separately excited field winding, and a series field winding excited in response to the motor current for said auxiliary generator whereby a substantially constant tension is maintained on said material during standstill and during the winding of said material.

DAVID R. SHOULTS.